March 1, 1938. J. R. OLIVER 2,109,949
SPECTACLES AND THE LIKE
Filed April 3, 1935
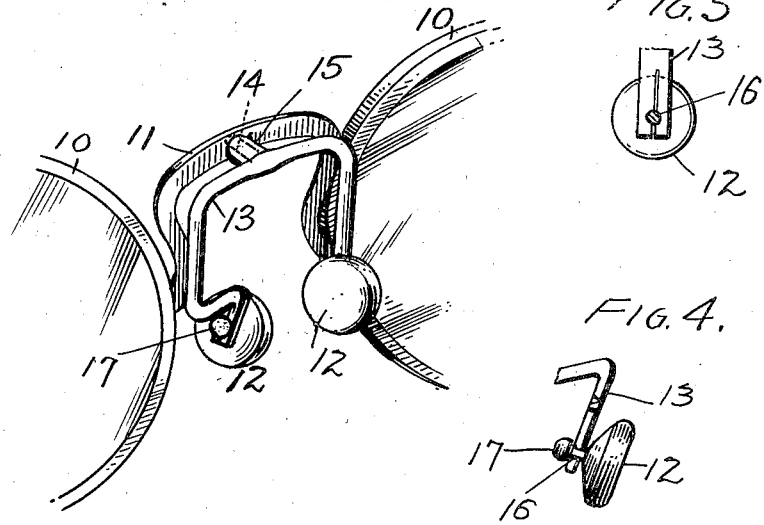
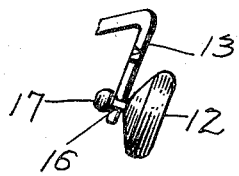
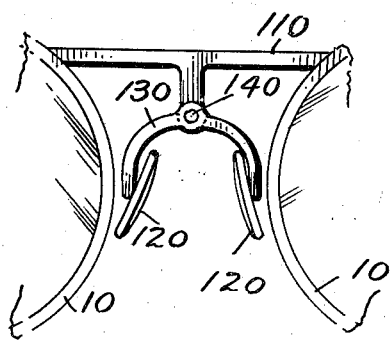
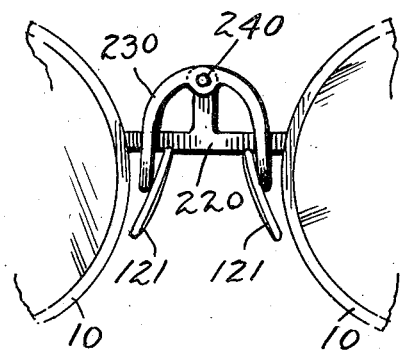
Inventor
John R. Oliver,
By Chas. J. Williamson
Attorney Patented Mar. 1, 1938

2,109,949

UNITED STATES PATENT OFFICE 2,109,949

SPECTACLES AND THE LIKE

John R. Oliver, Lisbon, Ohio

Application April 3, 1935, Serial No. 14,532

6 Claims. (Cl. 88—49)

My invention relates to spectacles of the type or kind having a rigid bridge extending between the lenses to arch over the nose of the wearer and provided for bearing contact with opposite sides of the nose with two pads, the latter being thus the whole provision for bearing contact with the nose. Because of improper or inaccurate adjustment, or because of distortion or bending of the frame parts, including the temples, only one of the pads may have bearing contact with the nose, with the result that the whole weight or pressure of the spectacles on the nose is borne by the one pad that alone has contact and thus an objectionable pressure on the nose is localized. Even if both pads have contact with the nose, the condition of the spectacles just described may result in unequal pressure with annoying or disagreeable results to the wearer.

The object of my invention is to provide a construction which will assure by an automatic or self-adjustment of the pads and adequate bearing of both pads on the nose so that the weight will be distributed equally or substantially equally between them and so that there will be no undue pressure exerted by a pad.

I achieve the object of my invention by so movably connecting the pair of pads to the proper spectacle frame member such as the customary rigid bridge that the two pads will be able at all times equally to bear upon opposite sides of the nose even under conditions of bending or distortion of the frame which would prevent that desirable condition.

My invention consists in whatever is described by or is included within the terms or scope of the appended claims.

My invention may be variously embodied and accordingly in the accompanying drawing, I show several embodiments thereof.

In such drawing:

Fig. 1 is a perspective view of enough of a pair of spectacles to illustrate an embodiment of my invention;

Figs. 2 and 3 are elevations of other embodiments of my invention.

Figs. 4 and 5 are detail views of the nose pad I prefer to use.

Describing what is shown in Fig. 1, the two lens rims 10 are rigidly attached to the opposite ends of a bridge 11, so arched, or of such curvature as to have no contact with the nose, as is characteristic of the type of spectacles to which my invention particularly pertains. The two nose pads 12, which may be of any desired construction are attached to the lower ends of a supplemental bridge 13, which is approximately of inverted U-shape and which is situated directly in rear of the bridge 11, and at the transverse center of the latter at the top is rockably mounted thereon as by a horizontal pivot pin 14, that passes forwardly from the top bar of the supplemental bridge 13 to which it is connected. Thus the supplemental bridge 13 with the two pads may freely rock bodily on a horizontal axis, the two nose pads 12 bodily moving with it so that when the glasses are applied to the nose, the two opposite pads 12 will seat themselves equally upon the opposite sides of the nose even though the glasses as a whole are not centrally placed with reference to the nose for such relative bodily movement of frame members and the supplemental bridge 13, takes place upon the pivot 14 to assure the automatic or self-accommodation of the pad-carrying supplemental bridge 13 and the fixed or rigidly held usual bridge 11. The supplemental bridge 13 is made of sufficiently rigid though light material as to maintain the pads at all times in proper bearing relation to the nose.

The bridge 11 may have a horizontally elongated boss 15, to provide an adequate bearing for the pivot 14.

Describing the embodiment of my invention shown in Fig. 2, instead of the arched form of bridge shown in Fig. 1 to connect the lens frames 10, such frames may be connected by a straight horizontal tie bar 110, having at its transverse center a short downwardly extending arm, to the lower end of which is hinged or pivoted as by a screw or pin 140, a supplemental bridge 130 of substantially inverted U-shape to which are secured opposite nose pads 120.

In Fig. 3 is shown a substitute for such a bridge as that shown in Fig. 1, which also includes a horizontal cross bar 220, that rigidly connects the opposite lens frames and which has an upwardly extending central arm to the top of which is hinged or pivoted by pin or screw 240, the supplemental bridge 230 of substantially inverted U-shape to the opposite lower ends of which are secured to the nose pads 121.

Nose pads with the ordinary spectacle construction each carried by its own supporting and attaching arm require attachment of each to the lens frame by gold solder so that as the pads of my invention are carried by the supplemental bridge which, of course, is not soldered to the frame, the necessity for gold soldering at two places is avoided.

Each nose pad may have, as shown in Fig. 1, a swiveled connection with the extremity of the supplemental bridge, so that it may adapt itself to the nose contour. Thus by the pivotal connection of the supplemental bridge, bodily adjustment of the nose pads to bear equally on the nose is secured, and there may be additional individual adjustment or adaptation of each nose piece independently of the other.

The nose pad I prefer to use is circular in form, as clearly shown in Figs. 1 and 5, so that no matter if it turns on its swiveled connection, it will be in proper position to bear upon the side of the nose and thus be free from an objection to an elongated nose pad, such as is commonly used which may turn to an upside down position or be awry or askew. The outer face of the nose pad 12 is convexly rounded with a convex periphery so as comfortably to contact with the flesh and the swivel is a centrally located round stem 16, turnably fitting a hole in the arm of the supplemental bridge 13, and having on the side thereof opposite the pad 12, a round head 17, with its surface next the bridge arm flared away therefrom so that with an outwardly flaring surface on the pad 12, that is next said arm, there is ample provision for the automatic swiveling or rocking action of the pad to fit or adapt itself to the nose. Besides the advantages of my pad above mentioned, it has the further advantage that it can be applied or assembled very readily.

What I claim is:

1. Optical glasses comprising lenses for the two eyes, a rigid member connecting the lenses, spaced nose-pads, substantially rigid nose pad carrying means connecting the nose pads together, and means rotatably connecting such nose pad carrying means with said lens-connecting member allowing bodily movement of the nose pads as a unit about an axis substantially normal to the plane of the lenses to equalize pressure of the nose pads on the wearer's nose, said nose pad carrying means including a pad-supporting element with opposite spaced-apart parts in fixed relation to one another, to which the pads are respectively secured.

2. An article as in claim 1, in which the nose pad carrying means is a substantially inverted U-shaped element rockably connected at its transverse center to said rigid member to rock on a horizontal axis.

3. Optical glasses comprising lenses for the two eyes, a rigid connection between the lenses, spaced nose-pads, nose pad carrying means connecting the nose-pads together as a unit, and means rotatably connecting said nose pad carrying means to said lens-connection and allowing relative bodily movement between the nose pad carrying means with said nose pads as a unit and said lens-connection about an axis substantially normal to the plane of the lenses.

4. Optical glasses comprising lenses for the two eyes, a rigid member connecting the lenses, nose pad carrying means including a pad-supporting element with opposite rigid terminals spaced apart and in fixed relation, to which the pads are respectively secured, and a rockable connection between said element and said rigid member with an axis substantially perpendicular to the plane of the lenses, said rockable connection allowing automatic rocking motion relative to one another of said rigid lens connecting member and said pad-supporting element under weight of the parts when the pads are in contact with the nose of the wearer.

5. Optical glasses comprising lenses for the two eyes, a rigid member connecting the lenses, nose pad carrying means, and means connecting such nose pad carrying means with said member allowing bodily movement of the nose pads with relation to said member to equalize pressure of the nose pads on the wearer's nose, the nose pad carrying means including an element of a shape to straddle the nose with a nose-side engaging pad at each side and pivoted midway between the pads to the rigid lens carrying member on an axis substantially perpendicular to the plane of the lenses, on which free movement can take place under the weight of the parts when the nose pads rest upon the nose of the wearer.

6. Optical glasses comprising lenses for the two eyes, a rigid connection between the lenses, inverted U-shaped nose pad carrying means, and pivotal means connecting said nose pad carrying means to said connection, the axis of said pivotal means being substantially perpendicular to the plane of the lenses to permit pivotal movement of the glasses, with respect to the nose pad carrying means, in the plane of the lenses.

JOHN R. OLIVER.